Sept. 10, 1935.  E. C. SLOAN  2,013,867
ART OF PRESERVING AND PROTECTING RECORDS AND THE LIKE
Original Filed May 19, 1934
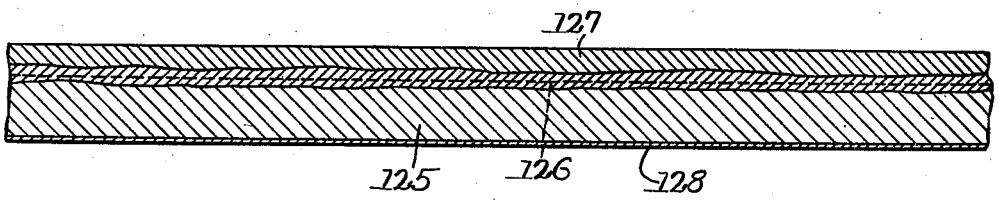
Inventor:
Edward C. Sloan
By: Parkinson & Lane Atty.

Patented Sept. 10, 1935

2,013,867

UNITED STATES PATENT OFFICE 2,013,867

ART OF PRESERVING AND PROTECTING RECORDS AND THE LIKE

Edward C. Sloan, Geneva, Ill., assignor to Jesse B. Hawley, Geneva, Ill.

Original application May 19, 1934, Serial No. 726,610. Divided and this application May 19, 1934, Serial No. 726,613

6 Claims. (Cl. 18—59)

The present invention relates to the preserving and protecting of records and the like by treating the same with a thermoplastic substance of a resinous base so as to present in the treated article given and desired physical properties and characteristics, and among the objects of the invention is to provide a novel article of the character indicated and a novel process of producing the same.

The method or process of this invention generally comprises the treatment of or application to the fibrous material of the article body and the record borne by it with or of a thermoplastic substance having the characteristics and properties later more fully described, and subjecting the aggregate to heat and pressure to effect the finished article.

The thermoplastic substance referred to above is in the class of synthetic resinous compounds known as the vinyl resins of the polymerization group and more particularly to those which are permanently thermoplastic, characterized by the bond group or radical —CH:CH$_2$, and which are insoluble in most all known solvents, particularly most all hydrocarbon solvents, except the solvents of the ester type or the higher ketones, such as hexone and butyrone. In other words, the substance used in this invention is chemically inert to the extent indicated above; and hence is impervious to and proof against moisture, water, acids, alkalies, alcohols, oils, greases, fats, and the like. In its normally pure state it is odorless, tasteless and colorless, that is, transparent. It is also non-inflammable. It may be given any desired color, or made translucent and the like by the use of suitable dyes, pigments and the like. It is also tough, durable and resilient. It also has a very strong bonding or adhesive property. If a pliant characteristic be desired, a plasticizer may be added to it to the extent of the pliability required. It may be applied in either liquid or dry sheet form. When applied in liquid form the article may be dipped in the liquid, or the liquid may be sprayed or brushed on the surface of the article, and the liquid permitted to dry until all of the volatile solvent has evaporated. Drying may be in the air of normal temperature and humidity known as "air dried" or may be in a dry heated fluid, such as hot air or gas or the like, known as "force dried".

When using the liquid form, acetone preferably is used as the solvent, but it is to be understood other solvents as mentioned above may be used without affecting the idea of invention herein disclosed.

The body of the article is usually of fibrous material such as paper and the like, although fibrous material of the textile type may also be used.

Other objects, capabilities, advantages, and the like are comprehended by the invention as will later appear and as are inherently possessed by the invention.

This application is a division of my co-pending application Serial No. 726,610, filed May 19, 1934.

Referring to the drawing, the figure represented is a fragmentary sectional enlarged view showing the idea of preserving any record bearing article, such as a print, picture, document, writing, typed or printed matter, photograph, painting, engraving, map, chart, newspaper, relief, etching or any other and like and similar article, so treated in accordance with the invention as to permanently and indefinitely preserve and protect such articles.

The term record is used herein generically to refer to any one of the articles that may be treated in accordance with this invention and which carries some kind of record on its surface whether it be a printed record or a pictorial showing or a photographic production or an engraving and so forth.

The record as shown comprises a body 125 usually in sheet form and usually of fibrous material such as paper or the like. On its surface is borne a record 126, such as print, or printed matter, a print, a painting, a lithograph, an engraving, a photograph, a drawing, and other like and similar records, the material of which has partly entered the interstices of the body 125 and in some cases partly projects over the surface of the body 125. To the surface of the record 126 and the body 125 are provided coverings 127 and 128 of the thermoplastic substances described above, in either liquid or dry sheet form.

The thermoplastic substance may be used either in sheet form by simply applying the sheets to the surfaces to be covered or coated, or it may be used in liquid form. The liquid form of the thermoplastic substance may be applied by dipping the body of the article in the solution, or by spraying the liquid on the surface, or by applying it with a brush. As the volatile solvent evaporates the liquid thickens and even becomes tacky. Air drying may be used but if desired the coating may be dried more quickly in heated air or the like. When the spraying method is used, it is preferable to use some of the higher volatiles mentioned above so that the evaporating of the volatile solvent may be slower. It is preferable to air dry first to obtain a removal of the major portion of the volatile solvent and then force dry, in heated air or the like, to remove the residual volatiles. The complete evaporation of the volatiles is to avoid the formation of bubbles, or the like, so that when heat and pressure are later applied there will be no bubbles or the like to be trapped and thus form blemishes, defects, flaws, or the like, in the covering of the finished article.

The next step is to heat and press the covered body so as to mold the thermoplastic substance. Ordinarily it will be desired to have a glossy or lustrous surface for the coating of the article and to effect this, the dies will have polished surfaces. In the cases of etchings, engravings and the like, where it is desired to retain the original characteristics thereof, the covering will not have a glossy or lustrous surface but will have a surface so roughened or formed as to be non-reflective of light and imperceptible whereby the etching, engraving or the like will be visible through the covering with its natural effect. To accomplish this the molding surface of the dies may have a specially fine mat or a sand blast finish whereby the surface of the covering will show no gloss or luster. The dies are heated to the necessary temperature to fuse or melt the thermoplastic substance so that it will be sufficiently plastic or fluidal to be displaced or to flow to assume an exact counterpart of the surfaces of the dies, under the influence of the heat and pressure of the dies. The dies are applied to the article with pressure and the pressure will assist to effect the result above indicated and also to press or compress the fibrous material should that be necessary. The thermoplastic substance will enter or penetrate into the interstices of the fibrous material to a greater or less extent depending upon the amount of thermoplastic substance used, and if desired the fibrous material may be entirely impregnated or permeated with the thermoplastic substance but in most cases it is only necessary to impregnate the surface portion of the article body. Where flexibility or pliability is desired as would be in most cases of records, a plasticizer may be used to the desired extent of the pliability required.

After the necessary heat and pressure have been applied the casting, that is, the article with the die molded thermoplastic substance united thereto, is allowed to cool while being maintained under pressure in the dies, the latter also being cooled. In this case the dies may be and usually are in the form of plates. The dies may then be removed. The finished article in most cases has a glossy or lustrous and transparent coating but in cases of etchings, engravings and so forth, the surface is without gloss or luster. The article with its record is thus embedded or enveloped or sealed in the thermoplastic material whereby the whole becomes practically an integral unit. In this way the record carried by the body 125 as also the body itself are permanently and indefinitely preserved and protected against aging, deterioration, discoloration, atmospheric conditions, vapors, smoke, chemicals, and the like.

When convenient, instead of deriving all of the heat from the dies to produce the desired effect, the assembly of the parts of the article may be heated in any suitable manner, not sufficient to cause the thermoplastic material to prematurely fuse or become plastic before the dies are applied. In such cases the dies need not be heated as much as when all of the heat necessary for the desired effect must be supplied wholly from the dies. The added heat when the dies are applied, will be sufficient to render the thermoplastic substance fluidal and become molded as described above. In that way a more thorough and a quicker thermoplastic action is effected and the time of cooling is decreased. Less heat is necessary in the dies and hence the dies cool more quickly.

While I have disclosed an illustrative embodiment of the invention and a mode of producing it, it is to be understood that the invention is not limited thereto but comprehends other features and process steps without departing from the spirit of the invention.

Having thus disclosed the invention, I claim:

1. A method of protecting and preserving a record and the body bearing the record comprising covering the record and said body with a permanently thermoplastic vinyl resin of the bond group —$CH:CH_2$ subjecting the same to heat to cause said substance to fuse and to unite with said record and body, and cooling the same to solidify said substance to form a protecting and preserving covering for said record and body.

2. A method of protecting and preserving a record and the body bearing the record comprising covering the record and said body with a thermoplastic vinyl resin of the bond group —$CH:CH_2$ subjecting the same to heat and pressure to cause said substance to fuse and to unite with said record and body, cooling the same while under pressure to solidify said substance to form a protecting and preserving covering for said record and body, and removing the pressure.

3. A method of protecting and preserving a record and the body bearing the record comprising covering the record and said body with a thermoplastic substance of a resinous base and having sufficient plasticizer to give said substance a given pliability when said substance is in solidified condition, subjecting the same to heat and pressure to cause said substance to fuse and to unite with said record and body, cooling the same while under pressure to solidify said substance to form a protecting and preserving covering for said record and body, and removing the pressure.

4. An article comprising a body and a record carried by said body, and a solidified covering of a thermoplastic vinyl resin of the bond group $CH:CH_2$ united to said record and body to protect and preserve the same.

5. An article comprising a body and a record carried by said body, and a solidified covering of a thermoplastic vinyl resin of the bond group $CH:CH_2$ and having a plasticizer sufficient for a given pliability of said article, said substance being united to said record and body to protect and preserve the same.

6. An article comprising a fibrous sheet body, a record carried by said body, and a covering therefor of a solidified thermoplastic vinyl resin of the polymerization group united to said record and body to protect and preserve the same.

EDWARD C. SLOAN.